US006368708B1

(12) United States Patent
Brown et al.

(10) Patent No.: US 6,368,708 B1
(45) Date of Patent: *Apr. 9, 2002

(54) POLYOLEFIN MICROSPHERES

(75) Inventors: Katherine A. Brown, Lake Elmo; Michael R. Kesti, Minneapolis, both of MN (US)

(73) Assignee: 3M Innovative Properties Company, St. Paul, MN (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/667,153

(22) Filed: Jun. 20, 1996

(51) Int. Cl.⁷ .................. C08F 110/06; B32B 3/16; B32B 27/06
(52) U.S. Cl. .............. 428/355 RA; 428/402; 428/355 EN; 526/161; 526/172; 526/308; 526/348.2; 526/348.3; 526/348.5; 526/351; 526/909; 526/931; 526/93; 526/94
(58) Field of Search .............. 428/402, 355 RA, 428/355 EN; 526/909, 308, 348.2, 348.3, 348.5, 93, 94, 161, 172, 351, 931

(56) References Cited

U.S. PATENT DOCUMENTS

| | | | |
|---|---|---|---|
| 3,691,140 A | 9/1972 | Silver | 260/78.5 |
| 4,166,152 A | 8/1979 | Baker et al. | 428/522 |
| 4,429,079 A | 1/1984 | Shibata et al. | 525/240 |
| 4,723,273 A | 2/1988 | Fink et al. | 585/511 |
| 5,030,606 A | 7/1991 | Klabunde | 502/155 |
| 5,045,577 A | 9/1991 | Mulhaupt et al. | 524/99 |
| 5,053,436 A | 10/1991 | Delgado | 521/64 |
| 5,055,438 A | 10/1991 | Canich | 502/117 |
| 5,064,802 A | 11/1991 | Stevens et al. | 502/155 |
| 5,157,164 A | 10/1992 | Olivier | 568/719 |
| 5,198,511 A | 3/1993 | Brown-Wensley et al. | 526/113 |
| 5,204,429 A | 4/1993 | Kaminsky | 526/308 |
| 5,296,566 A | 3/1994 | Brown-Wensley et al. | 526/171 |
| 5,412,046 A | 5/1995 | Yano et al. | 526/171 |
| 5,443,765 A | 8/1995 | Yoshimura et al. | 264/22 |
| 5,468,819 A | 11/1995 | Goodall et al. | 526/171 |
| 5,480,952 A | 1/1996 | Marks | 526/308 |
| 5,491,206 A | 2/1996 | Brown-Wensley et al. | 526/126 |
| 5,516,739 A | 5/1996 | Barborak et al. | 502/161 |
| 5,521,263 A | 5/1996 | Seeger et al. | 526/68 |
| 5,916,989 A | * 6/1999 | Brookhart, III et al. | 526/348.6 |

FOREIGN PATENT DOCUMENTS

| | | |
|---|---|---|
| DE | 29 23 206 A1 | 11/1980 |
| EP | 0 371 635 A | 6/1990 |
| EP | 0 454 231 A2 | 4/1991 |
| EP | 0 454 231 A2 | 10/1991 |
| EP | 0 504 418 A | 9/1992 |
| EP | 0 569 032 A3 | 10/1993 |
| EP | 0 603 557 A1 | 6/1994 |
| EP | 0 610 601 A1 | 8/1994 |
| JP | 07-25932 | 1/1995 |
| WO | WO 93/11184 | 6/1993 |
| WO | WO 95/03338 | 2/1995 |
| WO | WO 96/11963 | 4/1996 |
| WO | WO 96/23010 | 8/1996 |

OTHER PUBLICATIONS

T.W Helan, "Polymer Technology Dictionary," Chapman & Hall, London, 1994, 1, 312.*
Brintzinger, Hans H., et al., *Stereospecific Olefin Polymerization with Chiral Metallocene Catalysts*, Angew. Chem. Int. Ed. Engl. 1995, 34, p. 1143–1170.
M. Brookhart, B. Grant, A.F. Volpe, Jr., *Organometallics*, 1992, 11, 3929–22.
E. Hauptman, R.M. Waymouth, J.W. Ziller, *J. Am. Chem. Soc.*, 1995, 117, 11586–87.
Derwent Abstract AN73–4768 OU: JP 53–036512B.
Safir et al., Macromolecules, 1995, 28, 5396–98.
M. Brookhart, L.K. Johnson, C.M. Killian, S. Mecking, D.J. Tempel, *Polymer Preprints*, 1996, 37, 254–55.
R. Rulke, J.M. Ernsting, A.L. Spek, C. Elsevier, PWNM van Meeuen, K. Vrieze, *Inorg. Chem.*, 1993, 32, 5769–78.
H.T. Dieck, M. Svoboda, T. Greiser, *Z. Naturforsch*, 36b, 1981, 823–32.
J. Am. Chem. Soc., 1995, 117, 6414–6415, and Supplemetary Material.
PMSE Abstract, vol. 73, p. 458, Fall 1995, Proceedings of the American Chemical Society, Fall 1995, Chicago, Illinois.
Johnson et al. (J. Am. Chem. Soc., 1996, 118, 267–268 and Supplementary Material.

* cited by examiner

Primary Examiner—David W. Wu
Assistant Examiner—R. Rabago
(74) Attorney, Agent, or Firm—Philip Y. Dahl

(57) ABSTRACT

Microspheres comprise a polymer or copolymer including one or more of 1) a plurality of $C_3$ or larger alpha-olefin units wherein the polymer has an average number of branch points less than one per monomer unit, and 2) a plurality of $C_2$ alpha-olefin units wherein the polymer has an average number of branch points greater than 0.01 per monomer unit, the microspheres having an average diameter in the range of 1 to 300 micrometers. Optionally, the polymer of the microspheres can be crosslinked. The microspheres can be prepared by suspension or dispersion polymerization processes using aqueous or organic reaction media.

9 Claims, No Drawings

POLYOLEFIN MICROSPHERES

FIELD OF THE INVENTION

This invention relates to polyolefin microspheres and methods of preparation therefor.

BACKGROUND OF THE INVENTION

Inherently tacky, elastomeric microspheres have been described for use, for instance, as adhesives in repositionable pressure sensitive adhesive applications. Typically, microsphere adhesives are prepared via suspension polymerization of one or more free-radically polymerizable monomers, usually acrylate or methacrylate monomers, in the presence of surfactants and/or suspension stabilizers. Suspension polymerization is particularly advantageous, since microspheres result directly from the polymerization process as opposed to post-polymerization suspension of an already-formed polymer. Microsphere adhesives described to date comprise homopolymers or copolymers of acrylate or methacrylate monomers, presumably due to the ease with which such monomers can be suspension polymerized in aqueous systems. The preparation of acrylate-based microsphere adhesives is described in, for instance, U.S. Pat. Nos. 3,691,140, 4,166,152, and 5,053,436. Microsphere adhesives prepared from alpha-olefins have not been described.

Non-free radical polymerizations of ethylenically-unsaturated monomers are well known. Typically, these polymerizations use catalysts instead of initiators to effect polymerizations. Examples of such catalyzed polymerizations include Ziegler-Natta (ZN) polymerizations of alpha-olefins, ring-opening metathesis polymerizations ROMP) of cyclic olefins, group-transfer polymerizations (GTP), and cationic and anionic polymerizations of activated olefins such as styrene or acrylate. More recently, metallocene catalysts have received considerable attention for polymerization of alpha-olefins. ZN and metallocene catalysts for alpha-olefin polymerizations are susceptible to deactivation by adventitious oxygen and water, requiring that such deactivating materials be rigorously excluded from all reagents as well as the reaction vessel.

Recently, the polymerization of ethylene, other olefins, and alkynes using a polymerization catalyst whose cationic portion has the formula

LM—R⁺ wherein M is a Group VIII metal, L is a ligand or ligands stabilizing the Group VIII metal, and R is H a hydrocarbyl radical or a substituted hydrocarbyl radical, and a substituted tetraphenylborate anion as the counterion has been described in, e.g. European Patent Application No. 454231. A preferred cationic portion has the formula

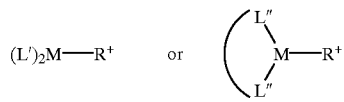

wherein L' is a two-electron donor ligand and L" L" are chelating ligands wherein each L" is a neutral two-electron donor ligand, M is nickel or palladium and L is a two-electron donor ligand or the two L' ligands together are a chelating ligand. Preparation of microspheres and, in particular, microsphere adhesives, was not disclosed.

In disclosures from the same laboratory, Johnson et al., (*J. Am. Chem. Soc.*, 1995, 117, 6414–6415 and supplementary material) describe Pd(II)- and Ni(II)-based catalysts for alpha-olefin polymerizations wherein the catalysts are, for example, cationic metal methyl complexes of the general formula

$\{(ArN=C(R^1)C(R^1)=NAr)M(CH_3)(OEt_2)\}^{+BAr'_4^-}$ wherein M is Pd or Ni, Ar' is $3,5\text{-}C_6H_3(CF_3)_2$, Ar is $2,6\text{-}C_6H3(R')$ where R' is isopropyl or methyl; $R^1$ is H. methyl, or the two $R^1$ groups taken together comprise a 1,8-naphthylene-diyl group. The same authors and S. J. McLain et al. reported that the same catalysts copolymerized ethylene and methyl acrylate (see PMSE Abstracts, Vol. 73, p. 458, Fall 1995, Proceedings of the American Chemical Society, Fall 1995, Chicago, Ill.). A full publication describing these findings and a catalyst $\{(ArN=C(R^1)C(R^1)=NAr)M(CH_2CH_2CH_2C(OR^2)(C=O))\}^{+BAr'_4^-}$ are reported by Johnson et al. (*J. Am. Chem. Soc.*, 1996, 118, 267–268 and supplementary material), wherein $R^2$ can be —$CH_3$, t-butyl, or —$CH_2(CF_2)_6CF_3$. Again, preparation of microspheres and, in particular, microsphere adhesives, was not disclosed.

SUMMARY OF THE INVENTION

Briefly, the present invention provides microspheres comprising a polymer including one or more of 1) a plurality of $C_3$ or larger alpha-olefin units wherein the polymer has an average number of branch points less than one per monomer unit, and 2) a plurality of $C_2$ alpha-olefin units wherein the polymer has an average number of branch points greater than 0.01, preferably greater than 0.05, more preferably greater than 0.10, per monomer unit incorporated into the polymer, said microspheres having an average diameter in the range of 1 to 300 micrometers. The microspheres of the invention are prepared as the polymerization product of one or more alpha-olefin hydrocarbon monomers having 2 to 30 carbon atoms, the polymerization being carried out in the presence of an effective amount of an organometallic catalyst comprising a Group VIII metal (CAS version of the Periodic Table), preferably Pd, the catalyst further comprising a polydentate ligand providing steric bulk sufficient to permit formation of polymer, and at least one liquid reaction medium in which the polymer microspheres are essentially insoluble.

In another aspect, the invention describes a method of producing the microspheres, comprising admixing, in any order, alpha-olefin monomer(s), catalyst, and at least one liquid reaction medium in which the resultant polymer is insoluble, and allowing polymerization of the alpha-olefin monomer(s) to take place.

One variation of the method comprises dispersing into an aqueous medium, in any order, one or more $C_2$ to $C_{30}$ alpha-olefin monomers, a polymerization organometallic catalyst comprising a Group VIII metal with which is complexed a polydentate ligand having steric bulk sufficient to permit formation of polymer, and optionally a surfactant or suspension stabilizer, and allowing the monomer(s) to polymerize, to produce polymer microspheres.

A second variation of the method comprises admixing one or more $C_2$ to $C_{30}$ alpha-olefin monomers, a polymerization organometallic catalyst comprising a Group VIII metal with which is complexed a polydentate ligand having steric bulk sufficient to permit formation of polymer, organic solvent in an amount sufficient to dissolve the monomer and catalyst and in which the polymer is insoluble, and allowing the monomers to polymerize to produce polymer microspheres; and optionally isolating the polymer microspheres produced by either variation of the method.

Preferably, the polymer $M_w$ of the microspheres is greater than 5000, preferably greater than 90,000, and most preferably greater than 100,000 up to about 5,000,000, preferably 2,000,000.

In still another aspect, the present invention provides microspheres comprising crosslinked alpha-olefin polymers. In one embodiment, a method employing high-energy irradiation of the polymer, preferably by electron beam irradiation, is used. In another embodiment, a method employing ultraviolet (UV) irradiation is used, the polymerized composition preferably further comprising UV-activated crosslinking agents.

In yet another aspect, the present invention provides films, fibers, articles and coatings comprising microspheres comprising a polymer including one or more of 1) a plurality of $C_3$ or larger alpha-olefin units wherein the polymer has an average number of branch points less than one per monomer unit, and 2) a plurality of $C_2$ alpha-olefin units wherein the polymer has an average number of branch points greater than 0.01 per monomer unit, preferably greater than 0.05, more preferably greater than 0.10, said microspheres having an average diameter in the range of 1 to 300 micrometers. Films, fibers, articles and coatings comprising the microspheres can be prepared by methods known in the art, such methods including solvent, dispersion or suspension coating, extruding, casting, melt processing, and powder coating.

In a still further aspect, microspheres comprising a polymer which is the polymerization product of an admixture of one or more $C_2$ to $C_{30}$ alpha-olefin monomers, an organometallic catalyst comprising a late metal, preferably Pd, complexed with a polydentate ligand having steric bulk sufficient to permit formation of a polymer having a weight average molecular weight of greater than 5,000.

In this invention:
"late metal" means a metal of Group VIII (CAS version of the Periodic Table);
"polymerization product" means an alpha-olefin polymer produced by allowing a polymerizable composition to polymerize, containing from 0 to 3 percent by weight of late metal;
"alpha-olefin" and "alpha-olefin hydrocarbon" are equivalent and mean a hydrocarbon containing a double bond in the 1-position, more particularly, ethylene or a 1-olefin containing three or more carbon atoms which can be acyclic or cyclic and preferably is an acyclic alpha-olefin;
"alpha-olefin polymer" means a polymer formed from at least one alpha olefin monomer which, not considering end groups, contains an average of two bonds connecting each monomer unit to other monomer units;
"branch point" means a C unit in the polymer backbone, bonded to three other carbon atoms, e.g.,

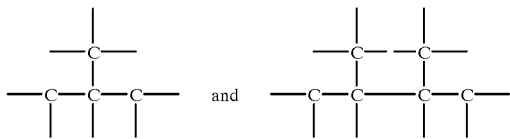

represent units with one and two branch points, respectively;
"steric bulk" means a size large enough and a location in the ligand sufficient to physically block access to non-polymerizing sites on the metal;

"alpha-olefin unit" means a group of carbon atoms in a polymer derived from polymerization of a single alpha-olefin molecule;
"high polymer" means a species having a weight average molecular weight ($M_w$) greater than 5,000, preferably greater than 90,000, more preferably greater than 100,000;
"poly" means two or more;
"organometallic catalyst" means a catalyst comprising a Group VIII metal, preferably one of Pd and Ni, more preferably Pd, a bidentate ligand having steric bulk sufficient to permit formation of polymers, and a metal to R bond, wherein R is H, a hydrocarbyl radical, or a hydrocarbyl radical substituted by at least one alkyl, haloalkyl or aryl group, each group having up to 20 carbon atoms;
"group" means a chemical species that allows for substitution or which may be substituted by conventional substituents that do not interfere with the desired product;
"insoluble" means less than five parts polymer dissolves in one hundred parts by weight of solvent at about 23° C.;
"Me" means methyl ($CH_3$—);
"Et" means ethyl ($CH_3CH_2$—);
"Bu" means butyl; "t-Bu" means tertiary butyl;
"i-Pr" means isopropyl; and
"gel fraction" means the fraction by weight of polymer that is insoluble in an appropriate solvent, e.g., toluene, particularly after crosslinking;
"hollow" means containing at least one void or cavity;
"cavity" means a space within the walls of a droplet or microsphere that is suspended or dispersed in the polymerization reaction medium, the space containing a portion of the reaction medium;
"void" means a space completely within the walls of polymerized microsphere;
"droplet" means the liquid stage of a microsphere prior to completion of polymerization; and
"solid" means free of voids and/or cavities, not hollow.

The present invention describes, for the first time, microspheres comprising a polymer including one or more of 1) a plurality of $C_3$ or larger hydrocarbon alpha-olefin units wherein the polymer has an average number of branch points less than one per monomer unit, and 2) a plurality of $C_2$ hydrocarbon alpha-olefin units wherein the polymer has an average number of branch points greater than 0.01, preferably greater than 0.05, and more preferably greater than 0.10 per monomer unit. Although the polymerization of alpha-olefin monomers to give polyolefins having this branching pattern have been previously described, polyolefins in the shape of microspheres having diameters of from about 1 to about 300 micrometers have not been previously described, nor had there been a teaching that hydrocarbon polyolefin microspheres comprising polymers having this branching pattern could be prepared.

Microspheres of the invention can exhibit a spectrum of properties depending on the monomer or monomer(s) selected. In addition, process conditions, such as the proportions of water, solvent, and monomer used, the amount and type of catalyst, and the amount and type of additives, can influence microsphere properties. Variable properties of the microspheres include physical properties such as shape, size, size range distribution and extent of agglomeration.

Other physical properties related to monomer selection include melting point, tack, hardness, flexibility, compressibility, toughness, and solubility in common organic solvents.

Microspheres comprising copolymers which are prepared from two or more alpha-olefin hydrocarbon monomers are also within the scope of the present invention. Also included are microspheres comprising copolymers prepared from at least one alpha-olefin hydrocarbon monomer and at least one non-alpha-olefin monomer.

DETAILED DESCRIPTION OF PREFERRED EMBODIMENTS OF THE INVENTION

The present invention describes alpha-olefin polymer microspheres comprising a polymer including one or more of 1) a plurality of $C_3$ or larger alpha-olefin units wherein the polymer has an average number of branch points less than one per monomer unit, and 2) a plurality of $C_2$ alpha-olefin units wherein the polymer has an average number of branch points greater than 0.01, preferably greater than 0.05, more preferably greater than 0.10, per monomer unit, said microspheres having an average diameter in the range of 1 to 300 micrometers. For some applications, a range of microsphere diameters of 10 to 250 micrometers can be preferred. Narrow distribution of diameters may be preferred in some applications, but generally, a wide range of diameters is useful. Microspheres of the invention are prepared from one or more alpha-olefin hydrocarbon monomers, an effective amount of an organometallic catalyst comprising a Group VIII metal (CAS version of the Periodic Table), preferably Pd, that is complexed with a polydentate ligand having steric bulk sufficient to permit formation of polymer, in the presence of at least one liquid reaction medium in which the polymer microspheres are essentially insoluble.

Microspheres of the invention can be prepared from alpha-olefin hydrocarbon monomers which include substituted and unsubstituted, including acyclic, branched, and cyclic alpha-olefins, wherein substituents on the olefin do not interfere with the polymerization process. Alpha-olefins preferred for polymerizations of the invention can have from 2 to about 30 carbon atoms, and include acyclic alpha-olefins such as ethylene, propene, 1-butene, 1-pentene, 1-hexene, 1-heptene, 1-octene, 1-decene, 1-dodecene, 1-tetradecene, 1-hexadecene, 1-octadecene, 1-eicosene, and the like, and cyclic alpha-olefins such as cyclopentene, and combinations thereof. Most preferably, alpha-olefins include ethylene, propene, 1-butene, 1-hexene, 1-octene, and other alpha-olefins up to about $C_{20}$. In some embodiments, liquid monomers are preferred, and higher boiling alpha-olefins, e.g., 1-hexene to about 1-eicosene, are particularly preferred.

Microspheres of the invention can be prepared from more than one monomer in the polymerizable composition, and microspheres comprising copolymers of two or more different alpha-olefin monomers, in any proportion, are within the scope of this invention. Copolymers may be random or blocky (block copolymers), depending on polymerization kinetics and processes. Other useful comonomers which are non-alpha-olefin monomers can include alkyl acrylates and methacrylates, and acrylic and methacrylic acids and salts thereof, providing the comonomers do not comprise more than about 10 mole percent of the total monomer composition, preferably not more than about 5 mole percent.

More particularly, hydrocarbon alpha-olefin microspheres of the invention can be prepared by admixing, in any order, alpha-olefin monomer(s), catalyst (described below), and at least one fluid, preferably a liquid, and allowing the monomer(s) to polymerize. The liquid can be any liquid in which the polymer is insoluble. One preferred liquid is water, which preferably can be used in an amount above the solubility limit of the alpha-olefin monomer(s) such that a second (aqueous) phase, preferably a continuous aqueous phase, is formed. Aqueous media can be present in at least 25 percent by weight, based on the total volume of the polymerizing reaction mixture, preferably 50 percent by weight, and most preferably 60 percent by weight. Water can be present in an amount up to about 99 percent by weight, based on the total weight of the polymerizable composition, preferably up to about 90 percent by weight, and more preferably up to about 80 percent by weight. Alpha-olefin monomer(s) form a suspension in the aqueous phase, preferably through the use of one or more surfactants or through high-shear stirring. The term "suspension polymerization" is commonly used to describe polymerizations of water-insoluble monomer(s) suspended as discontinuous droplets in a continuous aqueous phase wherein the polymerization reaction proceeds predominantly within the monomer droplet. Preferably, a small amount of an organic liquid, such as dichloromethane, can be used as an aid in dissolution of catalyst in the alpha-olefin monomer(s). As stated above, catalyst, monomer(s) and organic liquid can be added to the polymerization reaction mixture in any order.

Water can be desirable as a second phase in the preparation of microspheres of the invention because of its low toxicity and environmental impact, low cost, and large heat capacity. Microspheres may be easily handled in water as 'low-viscosity liquids' during synthesis, processing, and coating procedures.

Preferred liquids include organic solvents that dissolve hydrocarbon alpha-olefin monomer(s) but in which polymer microspheres are essentially insoluble. When organic solvents are used as the polymerization reaction medium, monomer(s), catalyst, optionally surfactant or suspension stabilizer, and solvent are mixed to form a solution, polymerization is allowed to occur, and the resulting polymer phase separates as microspheres as it is formed. The term "dispersion polymerization" is commonly used to describe this type of polymerization. Solvents useful in polymerizations that yield microspheres of the invention include esters such as ethyl acetate, ketones such as acetone or methyl ethyl ketone, halogenated solvents such as dichloromethane (which is preferred for polymerization of dodecene and hydrocarbon monomers having more than 12 carbon atoms), and ethers such as methyl t-butyl ether. Ethyl acetate is particularly preferred when it is desired to remove catalyst from the polymer microspheres. Palladium-containing compounds are formed in and remain soluble in ethyl acetate after polymerization takes place. The solubility of palladium compounds in ethyl acetate provides a means of removing palladium residues from alpha-olefin microspheres. Facile removal of palladium compounds is advantageous, since it provides microspheres that are free of contaminants as well as providing a means of recovering and recycling palladium. Other Lewis base solvents may similarly enable removal and recovery of palladium. When used, organic solvents can be present as at least 25 percent by weight of the total reaction mixture, preferably 50 percent by weight, and most preferably 60 percent by weight and up to 99 weight of the total composition.

Variations in order of mixing of reagents can be employed in the invention. For example, the neutral organometallic compound and cocatalyst salt (as described below) can be mixed together and added to the monomer, or the monomer can be mixed with neutral organometallic compound and the cocatalyst salt subsequently added to that mixture, or two separate monomer streams, one containing neutral organometallic compound and one containing cocatalyst salt can be mixed. Such process variability allows for the control of the onset of polymerization. Other process advantages such as solubilizing the organometallic compound or cocatalyst salt may also be achieved. Advantages of further variations in the order of mixing are apparent to those skilled in the art, and are within the scope of this invention. A plurality of dispersions and suspensions of microspheres can be mixed to achieve useful properties.

Polymerizations can be conducted at various temperatures. Preferably, the reaction temperature is −78° to +35° C., more preferably −40° to +25° C., and most preferably −10° to +20° C. For reactions conducted in aqueous liquid media, a minimum reaction temperature of about −5° C. is preferred. Temperatures above about 40° C. may deactivate the catalyst, and good thermal control may be preferred since the polymerization of alpha-olefin monomers is exothermic. It may be particularly advantageous to employ a second aqueous phase as a heat sink to aid in the control of reaction temperature.

Polymerizations can be conducted at atmospheric pressure or pressures greater than atmospheric, particularly in cases where one or more of the monomers is a gas. However, to avoid the expense of pressurized reaction vessels, liquid monomers may be preferred.

More particularly, surfactants and/or suspension stabilizers can be added to the aqueous phase prior to or after addition of a mixture of monomer and catalyst, or in any other useful sequence. Depending on process conditions, such as stirring rate, amount of surfactant, and other additives, polymer particles of different properties, including particle size, may be formed. Agglomeration of polymer may occur, again depending on variables such as monomer, reaction temperature, and additives, and is desirable in some processes (for example, where polymer is to be separated from the water) and undesirable in others (for example, where polymer is to be coated from the aqueous mixture).

Organometallic catalysts useful for preparation of hydrocarbon alpha-olefin microspheres of the invention comprise metals of Periodic Group VIII, ligands providing steric bulk sufficient to permit formation of polymers, and a metal to R bond, wherein R is H, a hydrocarbyl radical, or a hydrocarbyl radical substituted by at least one of alkyl, haloalkyl or aryl groups. Periodic Group VIII metals include Fe, Ru, Os, Co, Rh, Ir, Ni, Pd, and Pt, and preferred metals are Co, Ni and Pd. Ni and Pd are especially preferred, and Pd is most preferred. Ligands (L) can be selected so that, when they are coordinated to the metal atom, they are of sufficient size so as to block steric access to certain coordination sites on the metal atom. Without wishing to be bound by theory, it is believed that blocking certain sites will reduce or eliminate processes which result in displacement of the polymer chain from the metal, which prematurely terminates polymerization and results in lower polymer molecular weights. Thus, steric bulk in the ligand permits the formation of high polymer.

Preferred catalysts comprise ligands that are chelating. Chelating means that a ligand molecule contains two or more atoms or groups of atoms that are able to form coordinate links to a central metal atom. Preferred chelating atoms or groups of atoms are two-electron donors, preferably containing nitrogen, more preferably containing an imine

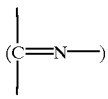

group. Most preferably a chelating ligand comprises two imine groups. Imine groups bearing a substituted or unsubstituted group on the nitrogen are preferred, more preferably such groups are polysubstituted aryl, and most preferably they are 2,6-disubstituted aryl. Substitutents on the aryl ring include alkyl, haloalkyl, and aryl, preferably alkyl, more preferably methyl or isopropyl, and most preferably isopropyl. Catalysts also comprise an atom or group R, defined below, which preferably is H or methyl, most preferably methyl. Catalyst examples include $ArN=C(R^1)C(R^1)=NAr$, wherein Ar is $2,6-C_6H_3(R^3)_2$, where each $R^1$ independently can be H or methyl or the two $R^1$ groups taken together can be 1,8-naphthalene-diyl, and each $R^3$ independently can be methyl, ethyl, isopropyl, or tert-butyl.

Organometallic catalysts useful for preparation of hydrocarbon alpha-olefin microspheres of the invention can be one-part or two-part. One-part catalysts are organometallic salts, preferably comprising a cationic portion comprising a Group VIII metal that is complexed with a polydentate ligand having steric bulk sufficient to permit formation of polymer, and a non-coordinating counterion, preferably an anion selected from the group consisting of $B(C_6F_5)_4^-$, $PF_6^-$, $SbF_6^-$, $AsF_6^-$, $BF_4^-$, $B\{3,5-C_6H_3(CF_3)_3\}_4^-$, $(R_fSO_2)_2CH^-$, $(R_fSO_2)_3C^-$, $(R_fSO_2)_2N^-$, $R_f$ is as defined below, which, when added to monomer, can immediately begin to form polymer, such that no additional reagents or further reactions are necessary to generate an active polymerization catalyst. Such catalysts are advantageous in certain processes, particularly when it is desired that a catalyst is to be added to the reaction mixture immediately before polymerization is to begin. For example, such catalysts can be useful in batch reactions used to prepare polymer.

Preparation of one-part Group VIII metal complexes useful as catalysts in the invention have been described in European Patent Application No. 454,231, and by Johnson et al. (J. Am. Chem. Soc., 1995, 117, 6414–6415), wherein these catalysts were disclosed to be useful in inert atmospheres. The catalysts were characterized as complexes having a cationic portion of the formula

wherein M is a Group VIII metal, L is a two-electron donor ligand or ligands, as defined above, stabilizing the Group VIII metal, and R is H, a hydrocarbyl radical or a substituted hydrocarbyl radical, wherein the substituting groups can be alkyl (1 to carbon atoms), aryl (5 to 20 carbon atoms), or halogen substituted alkyl. In European Patent Application No. 454,231, M is exemplified as cobalt and a substituted tetraphenylborate anion is described as the counterion. Tetraarylborate with ($CF_3$) substituents is preferred in the reference and $B\{3,5-C_6H_3(CF_3)_2\}_4^-$ is exemplified. A preferred cationic portion has the formula

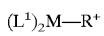

wherein the two $L^1$ groups are joined through chemical bonds and each $L^1$ is a two-electron donor ligand as defined above, and M and R are as previously defined.

Johnson et al. (J. Am. Chem. Soc., 1995, 117, 6414–6415) also describe catalysts comprising nickel or palladium and ligand groups chosen to provide steric bulk sufficient to permit formation of polymer. In particular, preferred Pd(II)- and Ni(II)-based catalysts for olefin polymerizations are cationic metal methyl complexes of the general formula

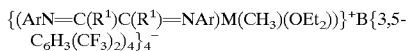

wherein M is Pd or Ni, Ar is $2,6\text{-}C_6H_3(R^3)_2$ where $R^3$ is isopropyl or methyl, and each $R^1$ independently is H or methyl, or the two $R^1$ groups taken together are 1,8-naphthalene-diyl. A catalyst disclosed in the reference is

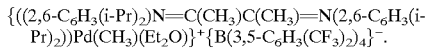

Also useful in the practice of the present invention are compounds of the formula

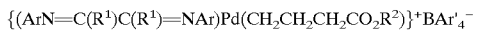

wherein $R^2$ can be $-CH_3$, t-butyl, or $-CH_2(CF_2)_6CF_3$, as reported by Johnson et al. (*J. Am. Chem. Soc.*, 1996, 118, 267–268 and supplementary material) to be useful in inert atmospheres.

Alternative counterions can be preferred to provide improved catalysts for preparing microspheres of the invention. One preferred counterion is $B(C_6F_5)_4^-$, which is commercially available from Boulder Scientific Company, Mead, Colo., and provides better control over polymer molecular weight. The counterion $B(C_6F_5)_4^-$ is particularly preferred for the preparation of microspheres in an aqueous medium. Other anions useful as the anionic portion of the catalysts of the present invention may be generally classified as fluorinated (including highly fluorinated and perfluorinated) alkyl- or arylsulfonyl-containing compounds, as represented by Formulas Ia through Id:

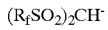 (Ia)

 (Ib)

 (Ic)

 (Id)

wherein each $R_f$ is independently selected from the group consisting of highly fluorinated or perfluorinated alkyl or fluorinated aryl radicals. Compounds of Formulas Ia, Ib and Ic may also be cyclic, when a combination of any two $R_f$ groups are linked to form a bridge.

The $R_f$ alkyl chains may contain from 1–20 carbon atoms, with 1–12 carbon atoms preferred. The $R_f$ alkyl chains may be straight, branched, or cyclic and preferably are straight. Heteroatoms or radicals such as divalent non-peroxidic oxygen, trivalent nitrogen or hexavalent sulfur may interrupt the skeletal chain. When $R_f$ is or contains a cyclic structure, such structure preferably has 5 or 6 ring members, 1 or 2 of which can be heteroatoms. The alkyl radical $R_f$ is also free of ethylenic or other carbon-carbon unsaturation: e.g., it is a saturated aliphatic, cycloaliphatic or heterocyclic radical. By "highly fluorinated" is meant that the degree of fluorination on the chain is sufficient to provide the chain with properties similar to those of a perfluorinated chain. More particularly, a highly fluorinated alkyl group will have more than half the total number of hydrogen atoms on the chain replaced with fluorine atoms. Although hydrogen atoms may remain on the chain, it is preferred that all hydrogen atoms be replaced with fluorine to form a perfluoroalkyl group, and that any hydrogen atoms beyond the at least half replaced with fluorine that are not replaced with fluorine be replaced with bromine and/or chlorine. It is more preferred that at least two out of three hydrogens on the alkyl group be replaced with fluorine, still more preferred that at least three of four hydrogen atoms be replaced with fluorine and most preferred that all hydrogen atoms be replaced with fluorine to form a perfluorinated alkyl group.

The fluorinated aryl radicals of Formulas Ia through Id may contain from 6 to 22 ring carbon atoms, preferably 6 ring carbon atoms, where at least one, and preferably at least two, ring carbon atoms of each aryl radical is substituted with a fluorine atom or a highly fluorinated or perfluorinated alkyl radical as defined above, e.g., $CF_3$.

Examples of anions useful in the practice of the present invention include: $(C_2F_5SO_2)_2N^-$, $(C_4F_9SO_2)_2N^-$, $(C_8F_{17}SO_2)_3C^-$, $(CF_3SO_2)_3C^-$, $(CF_3SO_2)_2N^-$, $(CF_4F_9SO_2)_3C^-$, $(CF_3SO_2)_2(C_4F_9SO_2)C^-$, $(CF_3SO_2)(C_4F_9SO_2)N^-$, $\{(CF_3)_2NC_2F_4SO_2\}_2N^-$, $(CF_3)_2NC_2F_4SO_2C^-(SO_2CF_3)_2$, $(3,5\text{-bis}(CF_3)C_6H_3)SO_2N^-SO_2CF_3$, $C_6F_5SO_2C^-(SO_2CF_3)_2$, $CF_6F_5SO_2N^-SO_2CF_3$, $CF_3SO_3^-$, $C_8F_{17}SO_3^-$,

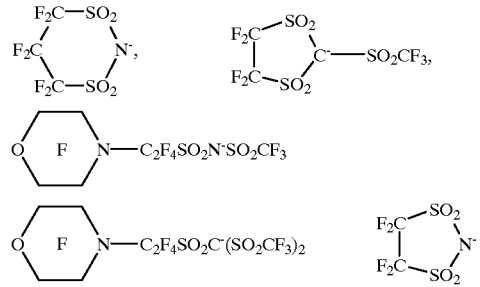

wherein F in the ring means the ring carbon atoms are perfluorinated. More preferred anions are those described by Formulas Ib and Ic wherein $R_f$ is a perfluoroalkyl radical having 1–4 carbon atoms. Particularly preferred anions for use in polymerizations carried out in organic solvents are those described by Formula Ic.

Anions of this type, and representative syntheses, are described in, e.g., U.S. Pat. Nos. 4,505,997, 5,021,308, 4,387,222, 5,072,040, 5,162,177, and 5,273,840, incorporated herein by reference, and in Turowsky and Seppelt, *Inorg. Chem.*, 1988, 27, 2135–2137. $\{C(SO_2CF_3)_3\}^-$, $\{N(SO_2CF_3)_2\}^-$ and $\{N(SO_2C_2F_5)_2\}^-$ are preferred, and $\{N(SO_2CF_3)_2\}^-$ and $\{N(SO_2C_2F_5)_2\}^-$ are particularly preferred. Such counterions may be preferred with certain metals and ligands, or in some processes. Other useful fluorinated non-coordinating counterions include $PF_6^-$, $SbF_6^-$, $AsF_6^-$, and $BF_4^-$.

In the preparation of one-part catalysts, diethyl ether can be useful but it is preferable to avoid its use because it can be dangerous to store and handle due to its extreme flammability and tendency to form explosive peroxides. Alternative useful ethers are organic compounds containing one ether-type oxygen atom and include tetrahydrofuran and methyl t-butyl ether. Methyl t-butyl ether is particularly preferred.

Preferred catalysts can be of the formula

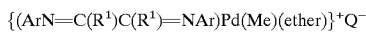

wherein Ar and $R^1$ are as previously defined and ether can be tetrahydrofuran, diethyl ether, or methyl t-butyl ether, and Q can be selected from $B(C_6F_5)_4$, anions as shown in Formulas Ia through Id, $PF_6$, $SbF_6$, $AsF_6$, and $BF_4$. Particularly preferred are compounds wherein ether is methyl t-butyl ether and Q is selected from $B(C_6F_5)_4$ and anions as shown in Formulas Ia through Id.

Examples of preferred one-part catalysts include:

$\{((2,6-C_6H_3(i-Pr)_2)N=C(CH_3)C(CH_3)=N(2,6-C_6H_3(i-Pr)_2))Pd(CH_3)(Me\ t-butyl\ ether)\}^+\{B(C_6F_5)_4\}^-$, $\{((2,6-C_6H_3(i-Pr)_2)N=C(CH_3)C(CH_3)=N(2,6-C_6H_3(i-Pr)))-Pd(CH_3)(Et_2O)\}^+\{B(C_6F_5)_4\}^-$, $\{((2,6-C_6H_3(i-Pr)_2)N=C(CH_3)C(CH_3)=N(2,6-C_6H_3(i-Pr)_2))Pd(CH_3)\ (tetrahydrofuran)\}^+\{B(C_6F_5)_4\}^-$, $\{((2,6-C_6H_3(i-Pr)_2)N=C(CH_3)C(CH_3)=N(2,6-C_6H_3(i-Pr)_2))Pd(CH_3)(Me\ t-butyl\ ether)\}^+\{N(SO_2CF_3)_2\}^-$, $\{((2,6-C_6H_3(i-pr)_2)N=C(CH_3)C(CH_3)=N(2,6-C_6H_3(i-Pr)_2))Pd(CH_3)-(Et_2O)\}^+\{N(SO_2CF_3)_2\}^-$, $\{((2,6-C_6H_3(i-Pr)_2)N=C(CH_3)C(CH_3)=N(2,6-C_6H_3(i-Pr)_2))Pd(CH_3)-(tetrahydrofuran)\}^+\{N(SO_2CF_3)_2\}^-$, $\{((2,6-C_6H_3(i-Pr)_2)N=C(CH_3)C(CH_3)=N(2,6-C_6H_3(i-Pr)_2))Pd(CH_3)(Me\ t-butyl\ ether)\}^+\{C(SO_2CF_3)_3\}^-$, $\{((2,6-C_6H_3(i-Pr))N=C(CH_3)C(CH_3)=N(2,6-C_6H_3(i-Pr)_2))Pd(CH_3)-Et_2O)\}^+\{C(SO_2CF_3)_3\}^-$, $\{((2,6-C_6H_3(i-Pr)_2)N=C(CH_3)C(CH_3)=N(2,6-C_6H_3(i-Pr)_2))Pd(CH_3)-(tetrahydrofuran)\}^+\{C(SO_2CF_3)_3\}^-$, $\{((2,6-C_6H_3(i-Pr)_2)N=C(CH_3)C(CH_3)=N(2,6-C_6H_3(i-Pr)_2))Pd(CH_3)Me\ t-butyl\ ether))\}^+\{N(SO_2C_2F_5)_2\}^-$, $\{((2,6-C_6H_3(i-Pr)_2)N=C(CH_3)C(CH_3)=N(2,6-C_6H_3(i-Pr)_2))Pd(CH_3)-(Et_2O)\}^+\{N(SO_2C_2F_5)_2\}^-$, $\{((2,6-C_6H_3(i-Pr)_2)N=C(CH_3)C(CH_3)=N(2,6-C_6H_3(i-Pr)_2))Pd(CH_3)-(tetrahydrofuran)\}^+\{N(SO_2C_2F_5)_2\}^-$, $\{((2,6-C_6H_3(Me)_2)N=C(CH_3)C(CH_3)=N(2,6-C_6H_3(Me)_2))Pd(CH_3)(Me\ t-butyl\ ether)\}^+\{B(C_6F_5)_4\}^-$, $\{((2,6-C_6H_3(Me)_2)N=C(CH_3)C(CH_3)=N(2,6-C_6H_3(Me)_2))Pd(CH_3)-(Et_2O)\}^+\{B(C_6F_5)_4\}^-$, $\{((2,6-C_6H_3(Me)_2)N=C(CH_3)C(CH_3)=N(2,6-C_6H_3(Me)_2))Pd(CH_3)-(tetrahydrofuran)\}^+\{B(C_6F_5)_4\}^-$, $\{((2,6-C_6H_3(Me)_2)N=C(CH_3)C(CH_3)=N(2,6-C_6H_3(Me)_2))Pd(CH_3)(Me\ t-butyl\ ether))\}^+\{N(SO_2CF_3)_2\}^-$, $\{((2,6-C_6H_3(Me)_2)N=C(CH_3)C(CH_3)=N(2,6-C_6H_3(Me)_2))Pd(CH_3)-(Et_2O)\}^+\{N(SO_2CF_3)_2\}^-$, $\{((2,6-C_6H_3(Me)_2)N=C(CH_3)C(CH_3)=N(2,6-C_6H_3(Me)_2))Pd(CH_3)(tetrahydrofuran))\}^+\{N(SO_2CF_3)_2\}^-$, $\{((2,6-C_6H_3(i-Pr)_2)N=C(CH_3)C(CH_3)=N(2,6-C_6H_3(i-Pr)_2))Pd(CH_3)(Me\ t-butyl\ ether))\}^+\{N(SO_2CF_3)(SO_2C_4F_9)\}^-$, $\{((2,6-C_6H_3(i-Pr)_2)N=C(CH_3)C(CH_3)=N(2,6-C_6H_3(i-Pr)_2))Pd(CH_3)-(Et_2O))\}^+\{N(SO_2CF_3)SO_2C_4F_9)\}^-$, $\{((2,6-C_6H_3(i-Pr)_2)N=C(CH_3)C(CH_3)=N(2,6-C_6H_3(i-Pr)_2))Pd(CH_3)-(tetrahydrofuran)\}^+\{N(SO_2CF_3)(SO_2C_4F_9)\}^-$, $\{((2,6-C_6H_3(i-Pr)_2)N=C(CH_3)C(CH_3)=N(2,6-C_6H_3(i-Pr)_2))Pd(CH_3)(Me\ t-butyl\ ether))\}^+\{BF_4\}^-$, $\{((2,6-C_6H_3(i-Pr)_2)N=C(CH_3)C(CH_3)=N(2,6-C_6H_3(i-Pr)_2))Pd(CH_3)(CH_3)(Et_2O)\}^+\{BF_4\}^-$, $\{((2,6-C_6H_3(i-Pr)_2)N=C(CH_3)C(CH_3)=N(2,6-C_6H_3(i-Pr)_2))Pd(CH_3)(Me\ t-butyl\ ether)\}^+\{CH(SO_2CF_3)_2\}^-$, $\{((2,6-C_6H_3(i-Pr)_2)N=C(CH_3)C(CH_3)=N(2,6-C_6H_3(i-Pr)_2))Pd(CH_3)-(Et_2O))\}^+\{CH(SO_2CF_3)_2\}^-$, $\{((2,6-C_6H_3(i-Pr)_2)N=C(CH_3)C(CH_3)=N(2,6-C_6H_3(i-Pr)_2))Pd(CH_3)(Me\ t-butyl\ ether)\}^+\{PF_6\}^-$, $\{((2,6-C_6H_3(i-Pr)_2)N=C(CH_3)C(CH_3)=N(2,6-C_6H_3(i-Pr)_2))Pd(CH_3)(Et_2O)\}^+\{PF_6\}^-$, $\{((2,6-C_6H_3(i-Pr)_2)N=C(CH_3)C(CH_3)=N(2,6-C_6H_3(i-Pr)_2))Pd(CH_3)(Me\ t-butyl\ ether)\}^+\{SbF_6\}^-$, $\{((2,6-C_6H_3(i-Pr)_2)N=C(CH_3)C(CH_3)=N(2,6-C_6H_3(i-Pr)_2))Pd(CH_3)(Et_2O)\}^+\{SbF_6\}^-$, $\{((2,6-C_6H_3(i-Pr)_2)N=C(CH_3)C(CH_3)=N(2,6-C_6H_3(i-Pr)_2))Pd(CH_3)(Me\ t-butyl\ ether)\}^+\{SO_3CF_3\}^-$, $\{((2,6-C_6H_3(i-Pr)_2)N=C(CH_3)C(CH_3)=N(2,6-C_6H_3(i-Pr)_2))Pd(CH_3)-(Et_2O)\}^+\{SO_3CF_3\}^-$, $\{((2,6-C_6H_3(i-Pr)_2)N=C(CH_3)C(CH_3)=N(2,6-C_6H_3(i-Pr)_2))Pd(CH_3)(Me\ t-butyl\ ether))\}^+\{SO_3C_4F_9\}^-$, $\{((2,6-C_6H_3(i-Pr)_2)N=C(CH_3)C(CH_3)=N(2,6-C_6H_3(i-Pr)_2))Pd(CH_3)-(Et_2O)\}^+\{SO_3C_4F_9\}^-$, $\{((2,6-C_6H_3(i-Pr)_2)N=C(CH_3)C(CH_3)=N(2,6-C_6H_3(i-Pr)_2))Pd(CH_3)(Me\ t-butyl\ ether)\}^+\{NSO_2(CF_2)_2SO_2\}^-$, and $\{((2,6-C_6H_3(i-Pr)_2)N=C(CH_3)C(CH_3)=N(2,6-C_6H_3(i-Pr)_2))Pd(CH_3)(Et_2O)\}^+\{NSO_2(CF_2)_2SO_2\}^-$.

Two-part catalysts comprise two reagents, a neutral organometallic compound and a cocatalyst salt, that react upon mixing optionally in the presence of monomer to yield an active catalyst. Two-part catalysts are particularly advantageous when partial mixing of monomer and an organometallic compound is desired (such as to achieve good solubility or suspension) but when it is also desired to initiate polymerization at a later time, for instance, when the second reagent is added. Process advantages resulting from the ability to control the time at which polymerization begins are significant. Two-part catalysts may also allow for the in situ generation of active catalytic compounds which cannot be isolated, and may also be preferred for those situations where the added time and expense of isolating a one-part catalyst are not warranted.

Two-part catalysts preferably comprise a neutral organometallic Pd compound which includes a ligand or ligands as previously defined, a moiety R which is H, hydrocarbyl radical, or substituted hydrocarbyl radical, and a halogen atom (preferably chlorine), and a cocatalyst. Preferred neutral compounds can be of the general formula $\{ArN=C(R^1)C(R^1)=NAr\}M(R)X$ where Ar, R and $R^1$ are as defined above, and X represents a halogen atom, preferably chlorine or bromine, most preferably chlorine.

Examples of preferred neutral compounds include:

(2,6-dimethylphenyl)N=C(Me)C(Me)=N(2,6-dimethylphenyl)Pd(Me)Cl, (2,6-diisopropylphenyl)N=C(Me)C(Me)=N(2,6-diisopropylphenyl)Pd(Me)Cl, (2,6-dimethylphenyl)N=C(H)C(H)=N(2,6-dimethylphenyl)Pd(Me)Cl, (2,6-diisopropylphenyl)N=C(H)C(H)=N(2,6-diisopropylphenyl)Pd(Me)Cl, (2,6-dimethylphenyl)N=(1,2-acenaphthylene-diyl)=N(2,6-dimethylphenyl)Pd(Me)Cl, wherein 1,2-acenaphthylene-diyl is represented by the structure

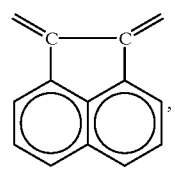

(2,6-diisopropylphenyl)N=(1,2-acenaphthylene-diyl)=N(2,6-diisopropylphenyl)Pd(Me)Cl. Especially preferred neutral compounds include (2,6-dimethylphenyl)N=C(Me)C(Me)=N(2,6-dimethylphenyl)Pd(Me)Cl and
(2,6-diisopropylphenyl)N=C(Me)C(Me)=N(2,6-diisopropylphenyl)Pd(Me)Cl.

Useful cocatalyst salts are of the general formula $$A^+Q^-$$

wherein A is selected from silver, thallium, and metals of Periodic Group IA, and Q is selected from $B(3,5\text{-}C_6H_3(CF_3)_2)_4$, $B(C_6F_5)_4$, anions as shown in Formulas Ia through Id, $PF_6$, $SbF_6$, $AsF_6$, and $BF_4$, and solvates and hydrates thereof. For some applications, silver salts are preferred and can have the formulae $Ag\{B(C_6F_5)_4\}(\text{arene})_p$ and $Ag\{B(C_6H_3(CF_3)_2)_4\}(\text{arene})_p$ wherein arene can be an aromatic hydrocarbon group having 6 to 18 carbon atoms that can be substituted by up to 6 alkyl or aryl groups each having up to 12 carbon atoms, preferably arene can be benzene, toluene, ortho-, meta-, or para-xylene, and mesitylene, and p can be an integer 1, 2, or 3. However, in some applications the less expensive alkali metal salts (Periodic Group 1A) are preferred. Particular counterions may be preferred under specific reaction conditions. For example, in two-part systems comprising a second aqueous phase, $B(C_6F_5)_4^-$ is preferred as an anion, and $LiB(C_6F_5)_4$ and solvates thereof are preferred as catalyst salts.

Examples of preferred cocatalyst salts include: $Ag^+\{B(C_6F_5)_4\}^-(\text{toluene})_3$, $Ag^+\{(B(C_6F_5)_4\}^-(\text{xylene})_3$, $Ag^+\{B(3,5\text{-}C_6H_{3(CF3)2})_4\}^-(\text{toluene})$, $Li^+\{B(C_6F_5)_4\}^-$, $Na^+\{B(3,5\text{-}C_6H_3(CF_3)_2)_4\}^-$, $Li^+\{B(C_6F_5)_4\}^-(Et_2O)_2$, $Li^+\{N(SO_2CF_3)(SO_2C_4F_9)\}^-$, $Li^+\{N(SO_2C_2F_5)_2\}^-$, $Li^+\{N(SO_2C_2F_5)_2\}^-(\text{hydrate})$, $Li^+\{N(SO_2C_4F_9)_2\}^-$, $Li^+\{NSO_2(CF_2)_2SO_2\}^-$, $Ag^+\{C(SO_2CF_3)_3\}^-Li^+\{C(SO_2CF_3)_3\}^-$, $Ag^+\{CH(SO_2CF_3)_2\}^-$, $Li^+\{CH(SO_2CF_3)_2\}^-$, $Ag^+\{BF_4\}^-$, $Na^+\{BF_4\}^-$, $Na^+\{PF_6\}^-$, $Ag^+\{PF_6\}^-$, $Na^+\{SbF_6\}^-$, $Ag^+\{SbF_6\}^-$, $Na^+\{AsF_6\}^-$, $Ag^+\{AsF_6\}^-$, $Ag^+\{SO_3CF_3\}^-$, $Na^+\{SO_3CF_3\}^-$, $Na^+\{SO_3C_4F_9\}^-$, and $Ag^+\{SO_3C_4F_9\}^-$.

In preparing the two-part catalyst, a neutral organometallic compound is reacted with a salt of a non-coordinating counterion preferably comprising fluorine to give an organometallic catalyst and a halide salt as by-product. Preferably, there is at least one mole of $A^+Q^-$ per mole of neutral organometallic compound. In some cases, excess $A^+Q^-$ may be preferred since $A^+Q^-$ may function as a surfactant in the reaction mixture.

As a preferred method for preparing a one-part catalyst, an alkali metal salt of a non-coordinating anion can be dissolved in water and treated with a molar equivalent of $AgNO_3$ at or near room temperature (20° to 25° C.). Within minutes, a reaction occurs. While not wishing to be bound by theory, the reaction product is believed to be the silver salt of the non-coordinating anion, stabilized by one or more water (solvent) molecules. This aqueous solution can then be mixed with an organic ether solution of $\{(Ar)N=C(R^1)C(R^1)=N(Ar)\}Pd(CH_3)(\text{halogen})$ wherein halogen is as defined above, and reaction occurs rapidly, essentially as fast as reagents in this two-phase system can mix across phase boundaries. The organic layer can be separated from solid AgCl (which may be recovered and recycled) and the aqueous layer, and removal of solvent produces clean one-part Pd catalyst in good yield. This method is preferred because it provides for rapid synthesis of one-part catalyst in good yield, and does not require the preparation and isolation of the silver salt of a non-coordinating counterion. This procedure can be used to prepare one-part Pd catalysts containing the following counterions: $\{C(SO_2CF_3)_3\}^-$, $\{B(C_6H_5)_4\}^-$, $\{B\{3,5\text{-}C_6H_3(CF_3)_2\}_4\}^-$, $(SO_3C_4F_9)$, $N(SO_2CF_2)_2^-$, $N(SO_2C_2F_5)_2^-$, and $NSO_2(CF_2)SO_2^-$.

A preferred method provides two-part catalysts useful in two-phase systems. This variation of a two-part catalyst comprises a neutral organometallic compound as described above and a cocatalyst of a Group IA metal in a two phase system. Such a catalyst system may be preferred because the second (preferably aqueous) phase provides a heat sink which moderates polymerization exotherms. This variation also avoids the expense and environmental hazards of silver-containing reagents. In the presence of an aqueous phase, these two-part catalysts rapidly initiate polymerization. Adjuvants optionally useful in any of the methods of catalyst synthesis of the invention include solvents such as methylene chloride, and the like.

One and two-part catalysts can be present in the range of 0.0001 to 20 weight percent, preferably 0.001 to 5 weight percent, most preferably 0.01 to 2 weight percent of the weight of alpha-olefin monomer. Microspheres may contain metal-containing residues, either as elemental metal or as inorganic or organometallic compounds, in the amount of 0 to 3 percent by weight of metal. Additional processing steps, such as washing with solvent, may be employed to remove metal residues from microspheres. Some or all of the metal residues may also be present in the aqueous or organic solvent phase, with or without the use of additional processing steps.

One- and two-part catalysts described herein can be used to prepare high polymer. However, use of appropriate variations in reaction conditions, such as low conversions of monomer to polymer, short reaction times, or higher catalyst to monomer ratios can lead to polymers of lower molecular weight. In particular, it is preferred to control of molecular weight by choice of catalyst to monomer ratio, and higher ratios (that is, more catalyst relative to monomer) result in lower molecular weights. Variations in ligand structure can also lead to lower polymer molecular weight. Such catalysts, methods and polymers are also useful and within the scope of the invention.

Additives, adjuvants and fillers as are known in the art can be added to the polymerizable composition for preparing the microspheres, providing they do not interfere with the intended polymerization process or adversely affect the chemical and physical properties of the resultant microspheres. Additives, adjuvants and fillers can include, but are not limited to, tackifiers, inorganic oxides, pigments, dyes, or other polymers. Adjuvants may be present in the composition in the range of 0.1 to 90 weight percent. Adjuvants may be supplied and used as suspensions.

Relatively acidic organic compounds, such as, e.g., phenols and carboxylic acids, can be present in the polymerizable compositions which provide microspheres of the invention without deleterious effect on the subsequent polymerization reaction. Thus, polymerization of 1-octene in the presence of a hindered phenol-type antioxidant, such as Irganox 1010™ (commercially available from Ciba-Geigy Corp.), has been demonstrated to proceed to completion in the same time period and with the same yield as polymerization of 1-octene in the absence of the antioxidant. Hindered phenol-type antioxidants useful in the invention are well known to those skilled in the art, and are described in Jesse Edenbaum, *Plastics Additives and Modifiers Handbook*, Van Nostrand Reinhold, New York (1992) pp. 193–207. It is advantageous to add hindered phenol-type antioxidants to polymers to improve polymer performance and aging. It is particularly advantageous to add the antioxidant to liquid monomer. Mixing is easier in monomer than in viscous polymer, and certain processes or product constructions may not allow for addition of antioxidant at a later stage in the process. Other acidic additives, such as carboxylic acids, may be advantageous to modify process conditions.

Other antioxidants containing phosphorus, for example, as phosphine or phosphite, are also known as additives in polymers. These secondary antioxidants halt polymerization. They can therefore be useful for stopping polymerization and they may also provide other benefits, for example, lighter color, but they are not usefully added to monomer prior to polymerization. Sulfur containing compounds such as thiols are also useful in halting polymerization, as are strong oxidants such as bleach (sodium hypochlorite).

Monomers or comonomers containing organic functional groups, such as carboxylic acids, and carboxylic acid salts and carboxylic esters, can also be useful to prepare microspheres in the invention. Such monomers may be useful to modify polymer properties (e.g., to increase modulus) or improve microsphere suspension stability, and may be present in amounts up to about 10 mole percent of total monomer content, more preferably up to about 5 mole percent.

Preferably, microspheres of the invention comprise greater than 90 mole percent hydrocarbon alpha-olefin polymers, and most preferably 95 mole percent hydrocarbon alpha-olefin polymers. Hydrocarbon polymer microspheres exhibit advantageous properties over those prepared, for instance, from acrylate ester monomers, such as decreased sensitivity to moisture, low corrosivity and low susceptibility to corrosion, low cost, good thermal and oxidative stability (particularly as compared to unsaturated polymers, such as those derived from dienes) and low dielectric constant.

Polymerizable compositions may further comprise surfactants, emulsifiers, or suspension stabilizers, or the polymerizations may be carried out under particular process conditions, that induce the formation of and substantially prevent the agglomeration of the resulting microsphere particles. Surfactants are preferred when a second aqueous phase is present. Ionic surfactants are preferred. Suitable surfactants include sodium, lithium, and ammonium sulfates and sulfonates. Specific examples of suitable surfactants include sodium heptadecyl sulfate, sodium lauryl sulfate, and ammonium lauryl sulfate. Certain surfactants contain groups which reduce catalyst activity, and these should be avoided in the practice of this invention. In particular, polyether groups and halides, such as are found in polyether sulfonate or tetraalkylammnonium halide surfactants, should be avoided. Surfactants, emulsifiers, and stabilizers can each be present in the composition in the range of about 0.01 to 5 weight percent.

Polymerizable compositions may also comprise suspension stabilizers in place of or in combination with surfactants. The terms "stabilizers" and "stabilization" mean the use of a method for producing polymer dispersions that are stable towards aggregation processes. This meaning is quite different from usage in other branches of polymer science, wherein "stability" and "stabilizers" can often be used to refer to processes and additives which confer on treated polymers an enhanced resistance towards thermal and/or photolytic degradation processes.

Preferable suspension stabilizers are those that effectively provide sufficient stabilization of the final polymerized droplets and reduce agglomeration within a suspension polymerization process. Useful polymeric suspension stabilizers include those salts of poly(acrylic acid) having an $M_w$ greater than about 5000, including ammonium, sodium, lithium and potassium salts; carboxy-modified poly (acrylamides) such as CYANAMER™ A-370 (commercially available from American Cyanamid Co.); copolymers of acrylic acid and dimethylaminoethyl methacrylate, polymeric quaternary amines such as GAFQUA™ 755, a quatermized poly(vinylpyrrolidone) commercially available from General Aniline and Film Corp. (GAF) or RJR™-400S, a quaternized-amine substituted cellulosic; and cellulosics and carboxy-modified cellulosics such as sodium carboxymethyl cellulose, commercially available as NATROSOL™ CMC Type 7L, commercially available from Hercules Chemicals, Wilmington, Del.

Useful inorganic suspension stabilizers include inorganic salts and oxides that are essentially insoluble in water, such as tribasic calcium phosphate, calcium carbonate, calcium sulfate, barium sulfate, barium phosphate, hydrophobic silicas, colloidal silica, magnesium carbonate, and aluminum oxide.

Microspheres of the invention can be solid, hollow, or a combination thereof. They may be spherical, or in other shapes, that is, microparticles. Other shapes include ovoids, other geometric shapes, and irregular structures, particularly including agglomerates.

The present invention provides microspheres comprising a polymer including one or more of 1) a plurality of $C_3$ or larger alpha-olefin units and the polymer has an average number of branch points less than one per alpha-olefin unit, and 2) a plurality of $C_2$ alpha-olefin units wherein the polymer has an average number of branch points greater than 0.01, preferably greater than 0.05, most preferably greater than 0.01. Without wishing to be bound by theory and recognizing that state-of-the-art analytical techniques are inadequate to determine all structural features, particularly minor ones, it is believed that polymers obtained using catalysts of the invention consist essentially of two types of repeating units: $\{-CH_2-CHR^4-\}_x$ and $\{-(CH_2)_n-\}_y$, wherein n is the number of carbon atoms in the alpha-olefin monomer used to make the polymer and $R^4$ is $\{CH_3(CH_2)_{(n-3)}-\}$. The number of branched units $\{-CH_2-CHR_4-\}$ is less than the total number of monomer units in the polymer, that is x has a value from 0.01 to 0.99, preferably 0.20 to 0.95, more preferably 0.40 to 0.90, and (x+y) has a value of 0.90 to 1.00. The polymer structure will vary as the monomer or monomers used in the polymerizable composition vary. For example, a polymer made from 1-octene, that is, n equals 8, has a structure consisting essentially of $\{-CH_2-CH(n-hexyl)-\}_x$ and $\{-(CH_2)_8-\}_y$, wherein x is in the range 0.45 to 0.70, and (x+y) is in the range 0.90 to 0.98. In another example, a polymer made from 1-hexene, that is, n equals 6, has a structure consisting essentially of $\{-CH_2-CH(n-butyl)-\}_x$ and $\{-(CH_2)_6-\}_y$, wherein x is in the range 0.50 to 0.75, and (x+y) is in the range 0.90 to 0.98. Polymers made from ethylene contain essentially two types of repeating units: $\{-CH_2-CHR^5-\}_p$ and $\{-(CH_2)_2-\}_q$ wherein $R^5$ is a linear or branched alkyl group of at least one carbon atom, up to at least 4 carbon atoms, p is at least 0.01, preferably 0.05, most preferably 0.10, and (p+q) is in the range of 0.90 to 0.98. Current NMR spectroscopic methods are insufficient to determine the maximum value for the number of carbon atoms in $R^5$, which preferably is at most 100. Those skilled in the art will recognize that variations in polymerizable composition, such as the kind and amount of optional solvent or aqueous phase or the catalyst selected and polymerization method can affect the polymer structure. Polymer structure can affect polymer properties, such as crystallinity or modulus, which, in turn, affects microsphere properties, including stickiness, tack, hardness, waxiness, slipperiness, or elasticity. When the polymerizable hydrocarbon alpha-olefin monomer used to prepare microspheres of the invention is ethylene, branching of greater than 10 mole percent is preferred.

For some applications, microspheres of a high molecular weight ($M_w$ over 90,000, preferably over 100,000, up to about 10,000,000, preferably up to about 2,000,000) are highly desirable. High polymers are easily handled in microsphere form (as suspensions, dispersions or dried powders) and can lead to improved product performance. High polymers can be obtained by, for instance, an appropriate choice of catalyst-to-monomer ratio. In addition, high polymers can be obtained by continuing the polymerization reaction essentially to completion, that is, consumption of substantially all available monomer. Low molecular weight polymeric microspheres ($M_w$ of from about 5000 to about 90,000) can also be useful, and can be advantageously processed as aqueous suspensions, organic dispersions, or as powders.

In some applications, crosslinked microspheres provide better product performance. Crosslinking may be accomplished during the polymerization reaction by copolymerization with a polyfunctional monomer, or may be effected by chemical reactions brought about by thermal means or actinic radiation, including high energy sources such as electron beams, gamma radiation, or ultraviolet irradiation, occurring after polymerization. Crosslinked microspheres are within the scope of this invention. Polymer gel fractions can be in the range of 1 to 100 percent, preferably 5 to 100 percent.

Microspheres comprising a polymer including one or more of 1) a plurality of $C_3$ or larger alpha-olefin units wherein the polymer has an average number of branch points less than one per monomer unit, and 2) a plurality of $C_2$ alpha-olefin units wherein the polymer has an average number of branch points greater than 0.01, preferably greater than 0.05, more preferably greater than 0.10, per monomer unit can be crosslinked via irradiation with electron beams at dosages preferably in the range of 20 MRad or less, more preferably 10 MRad or less. Advantageously, the crosslinked polyolefins are free of added chemical crosslinking agents that might otherwise impair the chemical or physical properties of the polymer or be disadvantageous in subsequent use, for example, due to color or leaching. Other useful high-energy sources are known, and are within the scope of the present invention.

Microspheres comprising a polymer including one or more of 1) a plurality of $C_3$ or larger alpha-olefin units wherein the polymer has an average number of branch points less than one per monomer unit, and 2) a plurality of $C_2$ alpha-olefin units wherein the polymer has an average number of branch points greater than 0.01, preferably greater than 0.05, more preferably greater than 0.10 per monomer unit of the present invention can also be crosslinked by ultraviolet irradiation. Preferably, and without wishing to be bound by theory, additives that absorb ultraviolet light and subsequently react to give radicals by homolytic cleavage and/or hydrogen abstraction are mixed with the polymer prior to irradiation. Typical additives include trihalomethyl-substituted s-triazines (such as 2-(4-methoxyphenyl)-4,6-bis(trichloromethyl)-1,3,5-triazine), aryl alkyl ketones (such as acetophenone, benzoin ethers, and ketals of benzil), and diaryl ketones (such as benzophenone and anthraquinone). Other useful additives will be apparent to those skilled in the art and are within the scope of this invention.

Microspheres are useful as a form of polymer due to the convenience with which they can be handled as a fluid suspension, recovered by centrifugation or agglomeration, or handled as free-flowing powders when removed from liquid.

Microspheres of the invention find use as powders or as suspensions in fluid media. Because of their ease of handling they may be processed further into, e.g., films, fibers, solutions, pellets, and beads, articles or coatings. Coatings comprising microspheres of the invention on a substrate can be continuous or discontinuous. Discontinuous coatings can be used, for example, as repositionable adhesives. Continuous coatings or films can be obtained by coating microspheres of the invention as a dispersion or suspension in an amount sufficient to completely cover the coated substrate. Alternatively, continuous coatings can be prepared by solvent-coating a solution of dissolved microspheres of the invention or by extruding previously isolated solid microspheres. Continuous coatings may be useful as pressure-sensitive adhesives. Free-standing films prepared from hydrocarbon alpha-olefin microspheres of the invention may be useful as adhesive films. Fibers can also be prepared from polymeric microspheres by means such as solvent casting or extrusion.

Objects and advantages of this invention are further illustrated by the following examples, but the particular materials and amounts thereof recited in these examples, as well as other conditions and details, should not be construed to unduly limit this invention.

EXAMPLES

All preparations and examples were run in air unless otherwise stated. Reagents were used as supplied and were handled in air, with no attempt to reduce or remove oxygen or water in reagents, solvents or glassware. Solvents used were typical reagent grade, not anhydrous grade. "Ambient temperature" is approximately 23° C. Throughout these examples, the shorthand notation C. is used to refer to an alpha-olefin containing z carbons. Thus, $C_2$ is ethylene, $C_3$ is propylene, $C_6$ is 1-hexene, $C_8$ is 1-octene, and so on. All chemicals can be obtained from Aldrich Chemical Company (Milwaukee, Wis.) unless otherwise noted.

Test Methods

Peel adhesion

Peel adhesion is the force required to remove an adhesive-coated flexible sheet material from a test panel measured at a specific angle and rate of removal. In the examples, the force is expressed in grams per width of adhesive-coated sheet.

Adhesion to Polyester (Poly(ethyleneterephthalate), PET)

Adhesion to polyester film was measured by application of a 3.2 cm-wide strip of polyester film to the surface of an adhesive-coated sample fixed on a horizontal test plate. A 2 kg hard rubber roller was used to apply the strip. The free end of the polyester film was attached to an adhesion tester load cell such that the angle of removal was 90° relative to the horizontal test plate. The polyester film strip was peeled from the adhesive at a constant rate of 31 cm per minute. A load cell reading in grams per 3.2 cm was recorded. The test was repeated and the data was reported as the average of the number of trials.

Adhesion to Bond Paper

Peel adhesion is the force required to remove a coated sheet from a bond paper substrate at a specific angle and rate of removal. In the examples, this force is expressed in grams per 2.54 cm width of coated sheet.

A strip, 2.54 cm wide, of coated sheet was applied to the horizontal surface of white bond paper (20 pound standard weight, 75 g/m², commercially available from Georgia Pacific Papers, Atlanta, Ga.). A 2 kg hard rubber roller was used to firmly apply the strip to the bond paper. The free end of the coated sheet was attached to an adhesion tester load cell such that the angle of removal was 90 degrees. The test plate was then clamped in the jaws of a tensile testing machine that was capable of moving the test plate away from the load cell at a constant rate of 31 cm per minute. A load cell reading in grams per 2.54 cm of coated sheet was recorded. The test was repeated and the data was reported as the average of the number of trials.

Molecular weights were determined by gel-permeation chromatography, referenced to polystyrene standards.

Preparation of Catalysts

Throughout these examples, the material referred to as Pd-A was $\{(2,6\text{-diisopropylphenyl})N=C(Me)C(Me)=N(2,6\text{-diisopropylphenyl})\}PdMeCl$, prepared according to known procedures:

A. Synthesis of ligand $(2,6\text{-}C_6H_3(i\text{-}Pr)_2)N=C(CH_3)C(CH_3)=N(2,6\text{-}C_6H_3(i\text{-}Pr)_2)$.

The ligand was prepared according to the procedure described in H. t. Dieck, M. Svoboda, T. Greiser Z. *Naturforsch*. 36b, 823–832. A mixture of 625 mL methanol, 41.7 g 2,3-butanedione, 171.75 g 2,6-diisopropylaniline and 6.75 g formic acid was prepared in air, then stirred under nitrogen atmosphere at ambient temperature for approximately 18 hr. A yellow precipitate formed, and was collected by filtration. The precipitate was recrystallized from hot ethanol to yield 152.6 gm of $\{2,6\text{-}C_6H_3(iPr)_2\}N=C(CH_3)C(CH_3)=N\{2,6\text{-}C_6H_3(i\text{-}Pr)_2\}$. This ligand was handled and stored in air.

B. Synthesis of (1,5-cyclooctadiene)Pd(Me)Cl

The compound was prepared according to the procedure described in R. Rulke, J. M. Ernsting, A. L. Spek, C.. Elsevier, P. W. N. M. van Meeuwen, K. Vrieze *Inorg. Chem.*, 1993, 32, 5769–5778. All procedures were conducted in a dry nitrogen atmosphere. The bright yellow solid (1,5-cyclooctadiene)PdCl$_2$, 49.97 g, was placed in 1 L of dry, deoxygenated CH$_2$Cl$_2$. While stirring, 37.46 g Me$_4$Sn was added, and the reaction was stirred at ambient temperature for a total of about 4 days. Black solids (presumably Pd metal) formed, and were removed occasionally during this time by filtration through a pad of Fuller's Earth (filter aid). When the reaction solution was a pale yellow, it was filtered once more, and solvent was removed. There was obtained 63.94 g white (1,5-cyclooctadiene)Pd(Me)Cl. This compound was preferably handled in an inert atmosphere.

C. Synthesis of $\{\{2,6\text{-}C_6H_3(i\text{-}Pr)_2\}N=C(CH_3)C(CH_3)=N\{2,6\text{-}C_6H_3(i\text{-}Pr)\}\}Pd(CH_3)Cl$.

This neutral organometallic compound was prepared according to the procedure described in L. K. Johnson, C. M. Killian, M Brookhart *J Am. Chem. Soc.*, 1995, 117, 6414–6415 and supplementary material. In an inert atmosphere (nitrogen), 31.64 g (1,5-cyclooctadiene)Pd(Me)Cl (synthesis B, above) was placed in 375 mL of dry deoxygenated diethyl ether. The (1,5-cyclooctadiene)Pd(Me)Cl was not completely dissolved. To this mixture was added 48.31 g $\{2,6\text{-}C_6H_3(i\text{-}Pr)_2\}N=C(CH_3)C(CH_3)=N\{2,6\text{-}C_6H_3(i\text{-}Pr)_2\}$ (synthesis A, above). An orange precipitate soon formed. The reaction mixture was stirred for about 18 hr, after which 44.11 g $\{\{2,6\text{-}C_6H_3(i\text{-}Pr)_2\}N=C(CH_3)C(CH_3)=N\{2,6\text{-}C_6H_3(i\text{-}Pr)_2\}\}Pd(CH_3)Cl$ was collected by filtration. This compound was handled and stored in air.

D. Synthesis and Isolation of One-Part Catalyst

A solution of 12.44 g LiN(SO$_2$CF$_3$)$_2$ (HQ115™, commercially available from 3M, St. Paul, Minn.) and 7.36 g AgNO$_3$ in 350 mL deionized water was stirred with a solution of 22.13 g Pd-A in 350 mL methyl t-butyl ether. A color change was evident within minutes. The ether layer was separated from the water and solids that formed, and washed with a second portion of water, then taken to dryness in vacuo to produce 30.79 g $\{(2,6\text{-diisopropylphenyl})N=C(Me)-C(Me)=N(2,6\text{-diisopropylphenyl})PdMe(methyl\ t\text{-butyl\ ether})\}^+\{N(SO_2CF_3)_2\}^-$, 86% of theoretical yield. NMR spectroscopy confirmed the identity of this compound.

Similarly, Pd catalysts containing the following counterions were prepared: $\{C(SO_2CF_3)_3\}^-$, $\{B(C_6H_5)_4\}^-$, $\{B\{3,5\text{-}C_6H_3(CF_3)_2\}_4\}^-$, $(SO_3C_4F_9)^-$, $\{N(SO_2C_2F_5)_2\}^-$, and $\{NSO_2(CF_2)_2SO_2\}^-$.

Example 1

Preparation of Microspheres

Microspheres of polyhexene were prepared as follows. A mixture of 50.0 g 1-hexene and 1.00 g Tergitol™ 7 (sodium heptadecyl sulfate, Union Carbide Corp., New York, N.Y.) was cooled to 10° C. Separately, 0.250 g of catalyst $\{((2,6\text{-}C_6H_3(i\text{-}Pr)_2)N=C(CH_3)C(CH_3)=N(2,6\text{-}C_6H_3(i\text{-}Pr)_2))Pd(Me)(Et_2O))\}^+\{B(C_6F_5)_4\}^-$ (Synthesis D) was dissolved in 2.5 g CH$_2$Cl$_2$. The catalyst solution was added to the cold 1-hexene mixture, which was then immediately added to 150 g of cold (10° C.) deionized water. The mixture was shaken vigorously for about 20 sec, then kept at 10° C. with intermittent shaking for 48 hr. At that point, a 5.369 g portion of the mixture was dried and found to contain 0.862 g of solids, that is, the mixture was 16% solids by weight (64% conversion of monomer; polyhexene $M_w=305,000$; $M_n=127,000$). Microscopic examination was conducted at 92 times magnification (92×, Microscope System supplied by Sci-Tech Supply, Minneapolis, Minn., consisting of Navitar lens and adapters 6010, 6030, and 6232, CCD Camera KP-MIU from Hitachi, Javelin Monitor BWM No. 9, Diagnostic Instruments U.S.A. Power Supply 100IL-PS, and Sony Video Graphic Printer UP-860). Analysis of the microspheres showed spheres of 20 to 60 micrometer diameter. Particle size analysis (Microtrac FRA Analyzer, Leeds and Northrup Instruments, North Wales, Pa.) showed a maximum in the size distribution at 36 micrometers. Polyhexene microspheres thus obtained were used in Examples 2, 3, and 4.

Example 2

Microspheres Coated on a Substrate

A portion of the microsphere suspension from Example 1 was coated on polyester film (Scotch™ 8050 film, 3M Company, St. Paul, Minn.) at a wet thickness of 0.1 mm, and dried in an oven at 150° C. for several minutes. Microscopic examination showed that the dried coating contained spheres of about 20 to 75 micrometer diameter. A more detailed view, by scanning electron microscopy (JEOL Model 820, JEOL USA Inc., Peabody, Mass.), showed that the spheres partially spread on the substrate, forming a discontinuous coating with irregularly shaped areas of adhesive having dimensions of about 10 to several hundred micrometers.

Example 3

Repositionable Adhesive

A portion of the microsphere suspension from Example 1 was coated at a wet thickness of 0.1 mm onto approximately half of a 5×10.8 cm piece of paper (yellow Post-It™ paper, 3M Company, St. Paul Minn.; the paper was cut to remove the adhesive that was present in the product as commercially supplied). The sample was dried in an oven at 150° C. for several minutes. The sample was then placed, coating side down, on a piece of white bond paper. Adhesion was sufficient that the larger piece of white paper could be handled (such as held vertically) while the yellow sample remained adhered to the white paper. The yellow sample was then easily peeled from the white paper and could be reapplied.

Example 4

Repositionable Adhesive

A 15.444 g sample of the microsphere adhesive of Example 1, suspended in water, was mixed with 0.606 g Shellflex 371 Oil (Shell Chemical Company, Houston Tex.). Portions of the unmodified microsphere sample (Example 1) and the oil-treated sample were coated onto pink Post-It™ paper (3M Company, St. Paul, Minn.) using a No. 40 wire-wrapped rod, and dried and examined as in Example 3. Both samples showed adhesion to paper, and could be removed and repositioned. The oil-treated sample showed qualitatively higher levels of adhesion; i.e., it was more difficult remove than the unmodified adhesive.

Example 5

Preparation of Microspheres

A solution of 0.40 g dodecyl sulfate, sodium salt and 60.02 g deionized water was cooled to 0° C. Separately, 0.229 g of catalyst $\{((2,6-C_6H_3(i-Pr)_2)N=C(CH_3)C(CH_3)=N(2,6-C_6H_3(i-Pr)_2))Pd(Me)(Et_2O)\}^+\{(C_6F_5)_4\}^-$ (Synthesis D), 2.0 g $CH_2Cl_2$ and 20.0 g cold (approximately 5° C.) 1-hexene were mixed, then added to the aqueous solution. The mixture was shaken, then stirred rapidly using a magnetic stir bar at 0° C. for about 16 hr. Then 0.25 g triphenylphosphite (TPP, GE Specialty Chemicals, Morgantown, W.Va.) was added, and the mixture was filtered through cheesecloth. The resulting suspension of microspheres contained 14.4% solids. Microscopic examination showed spheres of about 10 to 50 micrometers in diameter. The suspension was placed in a 250 mL separatory funnel and allowed to phase separate ("cream"). The lower (essentially aqueous) phase was drained through a stopcock at the bottom of the funnel. The upper "cream" phase was then collected; some of the polymeric product did not pass through the stopcock orifice. The cream which was collected was found to be 44.0% solids.

Example 6

Microsphere Adhesives

The creamy suspension from Example 5 was coated through a 0.025 mm orifice onto polyester film (Scotch™ 8050 film, 3M Company, St. Paul, Minn.). The coated samples were dried in a forced air oven at 66° C. for 15 min. The samples were evaluated for peel adhesion to polyester (average of 4 replicates) and bond paper (average of 3 replicates) in the manner described in Test Methods, above, peel adhesion values were found to be 13 g/3.18 cm and 11 g/2.54 cm, respectively. Samples were removed cleanly from the polyester and bond paper.

Example 7

Preparation of Microspheres in an Aqueous Medium (See Table 1)

Microspheres were prepared by mixing deionized water, alpha-olefin monomer, Pd-containing catalyst $\{((2,6-C_6H_3(i-Pr)_2)N=C(CH_3)C(CH_3)=N(2,6-C_6H_3(i-Pr)_2))Pd(Me)(Et_2O)\}^+\{B(C_6F_5)_4\}^-$ (Synthesis D) dissolved in a small amount of $CH_2Cl_2$, and surfactant, at the temperatures indicated, and allowing the mixtures to remain at that temperature for the indicated times. Polymer microspheres were obtained. The amounts of monomer, water, surfactant and any other additives are indicated in Table 1. The order of mixing was variable; the only significant effect of such variation on laboratory scale preparations which was observed was that addition of solid catalyst to water/monomer mixtures resulted in incomplete delivery of catalyst to the monomer phase, with some catalyst remaining as a third, solid phase. Initial mixing was accomplished by methods such as stirring with a magnetic stir bar (B) or by shaking (S). Some samples were agitated during polymerization as well: intermittently (I) or stirred continuously (C), or not at all (N). Generally, for otherwise similar samples, higher shear rates or increased stirring resulted in smaller microspheres. Microspheres were examined under a microscope to determine their size, indicated as a range of diameters observed (as described above) at 92×magnification.

TABLE 1

| Sample | Monomer, g | Water, g | Surfactant, g | Cat/CH$_2$Cl$_2$ mg/g | Other, g | Temp/time ° C./hr | Agitation | MS size micrometer |
|---|---|---|---|---|---|---|---|---|
| 7-A | C$_6$, 20 | 117.5 | DDSNa, 0.8 | 200/20 | (none) | 0/17 | S, N | 10–130 |
| 7-B | C$_6$, 20 | 60 | DDSNa, 0.4 | 229/1.6 | (none) | 0/17 | S, C | 10–80 |
| 1-C | C$_6$, 20 | 60 | DDSNa, 0.4 | 115/1.3 | (none) | 0/41 | S, C | 15–180 |
| 7-D | C$_6$, 5.023 | 15.003 | DDSNa, 0.102 | 57/0.687 | (none) | 0/18 | S, C | 10–140 |
| 7-E | C$_8$, 5.025 | 14.998 | DDSNa, 0.103 | 58/0.795 | (none) | 0/18 | S, C | 10–70 |
| 7-F | C$_6$, 5.076 | 15.056 | DDSNa, 0.101 | 63/0.562 | Wingtack Plus™, 0.753 | 0/18 | S, C | 10–50 |
| 7-G | C$_8$, 5.016 | 14.998 | DDSNa, 0.103 | 61/0.978 | Wingtack Plus™, 0.756 | 0/18 | S, C | 10–150 (ag) |
| 7-H | C$_8$, 25.00 | 75 | ALS, 1.73 | 100/1.51 | Wingtack Plus™, 2.51 | 10/66 | B, C | 5–120 (ag) |
| 7-I | C$_6$, 4.976 | 20.043 | Tergitol 7™, 0.059 | 27/0.800 | Colloidal Si, 0.226 | 0/90 | S, N | <5–60 |
| 7-J | C$_8$, 8.032 | 12.131 | LiB(C$_6$F$_5$)$_4$ (xs) | 36/2.210 | (none) | 23/0.2 | S, I | 10–140 |

In Table 1:

DDSNa is dodecylsulfate, sodium salt.

Wingtack Plus™ is a resin available from Goodyear Tire and Rubber Co., Akron Ohio. It was dissolved in alpha-olefin monomer and this solution was added to other materials in the sample.

ALS is ammonium lauryl sulfate; the weight indicated is the weight used of a gel of ALS in water 29% solids, supplied as Stepanol AM-V™ (Stepan Co., Northfield, Ill.).

(ag) indicates that in the sample examined by microscope, the largest spheres appeared be agglomerated with smaller spheres.

In Sample 7-J a two part catalyst was used: 36 mg of $((2,6\text{-}C_6H_3(i\text{-}Pr)_2)N=C(CH_3)C(CH_3)=N(2,6\text{-}C_6H_3(i\text{-}Pr)_2))Pd(Me)Cl$ (Catalyst preparation "C", above) in 2.210 g $CH_2Cl_2$ was added to 8.032 g 1-octene, and this was added to a mixture of 112 mg Li $B(C_6F_5)_4$ (Boulder Scientific, Mead, CO) in 12.131 g water. This reaction exothermed in about 6 minutes, and at the elevated temperature the catalyst was deactivated, halting significant further polymerization.

The microspheres of Sample 7-B were dried and the polymer molecular weight was determined to be $M_w=341,000$, $M_n=186,000$.

The microspheres of Sample 7-C were dried and the polymer molecular weight was determined to be $M_w=240,000$, $M_n=132,000$.

Example 8

Preparation of Microspheres in an Organic Liquid Medium

Microspheres were prepared by mixing an organic liquid medium, alpha-olefin monomer, and Pd-containing catalyst $\{((2,6\text{-}C_6H_3(i\text{-}Pr)_2)N=C(CH_3)C(CH_3)=N(2,6\text{-}C_6H_3(i\text{-}Pr)_2))Pd(Me)(Me\ t\text{-}Bu\ ether))\}^+\{N(SO_2CF_3)_2\}^-$ (Synthesis D) at the temperatures indicated in Table 2, below, and allowing the mixtures to remain at that temperature for the indicated times. Polymer microspheres formed. The amounts of materials and conditions are indicated Table 2. Initial mixing was accomplished by methods such as stirring with a magnetic stir bar (B), shaking (S), or mechanically-driven paddle(P). Some samples were agitated during polymerization as well: intermittently (I) or stirred continuously (C), or not at all (N). The microspheres were examined under a microscope to determine their size, and the molecular weight of the polymer in the microspheres was also determined for selected samples. Generally, the lower size microspheres (dimension=diameter) were present in small amounts, having mostly agglomerated to larger irregular shapes of the approximate larger size (dimension maximum length) indicated. For some samples, portions of the microspheres were collected by filtration and dried to give powders.

qualitative. Sample 8-J was particularly agglomerated so the maximum size of the particles was not determined (entry "nd"). The agglomerates were small enough to allow for easy handling and processing, and the microsphere suspensions formed in organic liquid were handled as fluids, by means such as pouring.

Example 9

Preparation of Crosslinked Microspheres.

Three samples of microspheres were prepared from alpha-olefin monomer using $\{(2,6\text{-diisopropylphenyl})N=C(Me)\text{---}C(Me)=N(2,6\text{-diisopropylphenyl})PdMe(methyl\ t\text{-butyl\ ether}))\}^+\{N(SO_2CF_3)_2\}^-$ catalyst (Synthesis D), which were mixed with other additives by shaking and then maintained at 0° C. without further agitation for about 18 hr. Amounts of liquid medium and additives were:

Sample 9-A, 97 mg Pd catalyst, 0.122 g benzophenone, 19.2 g ethyl acetate, and 10.26 g 1-octene.

Sample 9-B, 97 mg Pd catalyst, 0.096 g 2-(3,4-dimethoxyphenyl)-4,6-bis(trichloromethyl)-1,3,5-triazine (the preparation of which is described in German Patent 1,200,314), 17.566 g ethyl acetate, and 10.02 g 1-decene.

Sample 9-C, 101 mg Pd catalyst, 10.64 1-hexene, 17 gm deionized water, 0.1 g benzophenone, and 0.1 g dodecylsulfate, sodium salt.

After 18 hr, 0.16 g triphenylphosphite was added to each sample to halt further polymerization.

The microspheres in Samples 9-A and 9-B were separated from ethyl acetate by filtration, and dried under vacuum. A portion of each dried sample, about 3 g, was placed in a layer in a pan of area about 20 cm$^2$, and then irradiated under a medium pressure mercury arc lamp (14 mW/cm$^2$) for 11 min, stirring the solid microspheres once. An attempt was then made to prepare solutions of the samples so as to measure the fraction of polymer gel (crosslinked polymer) in unirradiated (9-A-un and 9-B-un) and irradiated (9-A-ir and 9-B-ir) microsphere samples: about 1 g of each sample was placed in 20 ml of toluene, which was gently agitated for about 72 hr. Portions of each solution were then placed in filters, but only Sample 9-A-un passed through the filter. Swollen gelled particles were visible in Samples 9-A-ir and 9-B-ir, particularly as they collected on the glass sample container, and these clogged the filter medium so that no filtrate was obtained.

TABLE 2

| Sample | Monomer, g | Solvent, g | Catalyst mg | Other, g | Rxn, Cond ° C./hr | Agitation | MS size microns |
|---|---|---|---|---|---|---|---|
| 8-A | C$_8$, 200 | ethyl acetate, 800 | 596 | — | 10/18 | B, C | 5–350 |
| 8-B | C$_8$, 160 | ethyl acetate, 602 | 670 | — | 0/90 | B, C | 10–250 |
| 8-C | C$_8$, 155 | ethyl acetate, 604 | 670 | Wingtack Plus, 7.607 | 0/90 | B, C | 5–300 |
| 8-D | C$_8$, 1 | MEK, 5.009 | 12 | — | 0/18 | S, N | 5–300 |
| 8-E | C$_8$, 1 | Me t-Bu ether, 5.004 | 10 | — | 0/18 | S, N | 1–5 (fine) |
| 8-F | C$_{12}$, 1000 | CH$_2$Cl$_2$, 1011 | 2230 | — | 0/72 | S, N | 10–250 |
| 8-G | C$_{12}$, 5 | ethyl acetate, 20 | 30 | — | 0/18 | S, N | 10-200 |
| 8-H | C$_{10}$, 5 | ethyl acetate, 20 | 30 | — | 0/18 | S, N | 10-300 |
| 8-I | C$_{18}$, 5 | ethyl acetate, 20 | 30 | — | 0/18 | S, N | 10-140 |
| 8-J | C$_6$, 5 | ethyl acetate, 20 | 30 | — | 0/18 | S, N | 10-nd |

In Table 2:
MEK means methyl ethyl ketone;
Determination of the largest dimension of agglomerated microspheres was subjective and should be considered The microspheres in Sample 9-C were similarly irradiated as an aqueous suspension in an open beaker with sample surface area 7.9 cm$^2$, with constant stirring, for 11 min. When examined under the microscope, microspheres were observed of size range 15–150 micron in both Samples (9-C-un and 9-C-ir). Water was removed and the microspheres were dried under vacuum. An attempt was then made, as described above, to prepare toluene solutions of these samples and filter them. Sample 9-C-un filtered slowly, but Sample 9-C-ir did not pass through the filter, because swollen gelled microspheres clogged the filter.

While it was not possible to quantitatively measure gel fractions in these samples, the example showed that UV irradiation of microspheres containing additives resulted in crosslinked microspheres.

Various modifications and alterations of this invention will become apparent to those skilled in the art without departing from the scope and spirit of this invention, and it should be understood that this invention is not to be unduly limited to the illustrative embodiments set forth herein.

We claim:

1. Microspheres comprising a polymer of propylene, said polymer consisting essentially of two repeating units: $\{-CH_2-CH(CH_3)-\}_x$ and $\{-(CH_2)_3-\}_y$, wherein x is a number from 0.01 to 0.99, and wherein the sum (x+y) is a number from 0.90 to 1.00, said microspheres having an average diameter in the range of 1 to 300 micrometers.

2. Microspheres according to claim 1 wherein x is a number from 0.20 to 0.95.

3. Microspheres according to claim 1 wherein x is a number from 0.40 to 0.90.

4. Microspheres according to claim 1 wherein said polymer has a weight average molecular weight in the range of greater than 5,000 to 5,000,000.

5. Microspheres according to claim 1 which are suspended in a fluid medium.

6. An adhesive construction comprising microspheres according to claim 1.

7. The construction according to claim 6 comprising a flexible backing having on at least one surface thereof a layer of said microspheres.

8. The adhesive construction according to claim 7 which is repositionable.

9. The adhesive construction according to claim 7 wherein said layer of microspheres is discontinuous.

* * * * *

UNITED STATES PATENT AND TRADEMARK OFFICE
CERTIFICATE OF CORRECTION

PATENT NO. : 6,368,708 B1
DATED : April 9, 2002
INVENTOR(S) : Brown, Katherine A.

It is certified that error appears in the above-identified patent and that said Letters Patent is hereby corrected as shown below:

Column 1,
Line 32, "ROMP)" should read -- (ROMP) --
Line 49, "R is H" should read -- R is H, --
Line 62, "and L is a" should read -- and L' is a --

Column 2,
Line 7, "2,6-C$_6$H3(R')" should read -- 2,6-C$_6$H$_3$(R') --
Line 7, "R$^1$is H." should read -- R$^1$ is H, --

Column 8,
Line 30, "$(R_fSO_2)_2N^-$, $R_f$ is" should read -- $(R_fSO_2)_2N^-$, and $R_fSO_3^-$, $R_f$ is --

Line 53, "(1 to carbon atoms)," should read -- (1 to 10 carbon atoms), --

Column 9,
Line 5, "$\{(ArN=C(R^1)C(R^1)=NAr)M(CH_3)(OEt_2))\}^+B\{3,5-C_6H_3(CF_3)_2\}_4\}^-$" should read -- $\{(ArN=C(R^1)C(R^1)=NAr)M(CH_3)(OEt_2))\}^+B\{3,5-C_6H_3(CF_3)_2\}_4^-$ --

Column 11,
Line 7, "$\{((2,6-C_6H_3(i-Pr)_2)N=C(CH_3)C(CH_3)=N(2,6-C_6H_3(i-Pr)))-Pd(CH_3)(Et_2O)\}^+\{B(C_6F_5)_4\}^-$," should read -- $\{((2,6-C_6H_3(i-Pr)_2)N=C(CH_3)C(CH_3)=N(2,6-C_6H_3(i-Pr)_2))-Pd(CH_3)(Et_2O)\}^+\{B(C_6F_5)_4\}^-$, --

Line 14, "$\{((2,6-C_6H_3(i-pr)_2)N=C(CH_3)C(CH_3)=N(2,6-C_6H_3(i-Pr)_2))Pd(CH_3)-(Et_2O)\}^+\{N(SO_2CF_3)_2\}^-$," should read -- $\{((2,6-C_6H_3(i-Pr)_2)N=C(CH_3)C(CH_3)=N(2,6-C_6H_3(i-Pr)_2))Pd(CH_3)-(Et_2O)\}^+\{N(SO_2CF_3)_2\}^-$, --

UNITED STATES PATENT AND TRADEMARK OFFICE
CERTIFICATE OF CORRECTION

PATENT NO. : 6,368,708 B1
DATED : April 9, 2002
INVENTOR(S) : Brown, Katherine A.

It is certified that error appears in the above-identified patent and that said Letters Patent is hereby corrected as shown below:

Column 11, cont'd,
Line 20,
" $\{((2,6-C_6H_3(i-Pr))N=C(CH_3)C(CH_3)=N(2,6-C_6H_3(i-Pr)_2))Pd(CH_3)-Et_2O)\}^+\{C(SO_2CF_3)_3\}^-$, "
should read -- $\{((2,6-C_6H_3(i-Pr)_2)N=C(CH_3)C(CH_3)=N(2,6-C_6H_3(i-Pr)_2))Pd(CH_3)-(Et_2O)\}^+\{C(SO_2CF_3)_3\}^-$, --
Lines 25, 39, 45 and 54, "ether))}" should read -- ether)} --
Line 43, "(tetrahydrofuran))}" should read -- (tetrahydrofuran)} --
Lines 49 and 61, $(Et_2O))\}$" should read -- $(Et_2O)\}$ --
Line 56, "$\{BF_4\}^-$," should read -- $\{BF_4\}^-$, --

Column 12,
Line 2, "$\{SbF_6\}^-$," should read -- $\{SbF_6\}^-$, --
Line 8, "ether))}" should read -- ether)} --

Column 13,
Line 27, " $5-C_6H_3(CF_3)_2)_4\}^-$ (toluene), " should read -- $5-C_6H_3(CF_3)_2)_4\}^-$ (toluene), --
Line 67, "$N(SO_2CF_2)_2^-$," should read -- $N(SO_2CF_3)_2^-$, --

Column 16,
Line 5, "quartermized" should read -- quarternized --
Line 39, "$\{CH_3(CH_2)_{(n-3)}^-\}$." should read -- "$\{CH_3(CH_2)_{(n-3)}^-\}$. --
Line 39, "$\{CH_2-(CHR_4^-\}$" should read -- $\{CH_2-(CHR^{4-}\}$ --

Column 18,
Line 36, "notation C. is" should read -- notation $C_Z$ is --

Column 20,
Line 21, "$(Et_2O))\}$" should read -- $(Et_2O)\}$ --

UNITED STATES PATENT AND TRADEMARK OFFICE
CERTIFICATE OF CORRECTION

PATENT NO. : 6,368,708 B1
DATED : April 9, 2002
INVENTOR(S) : Brown, Katherine A.

It is certified that error appears in the above-identified patent and that said Letters Patent is hereby corrected as shown below:

Column 21,
Table 1, Sample column "1-C" should read -- 7-C --

Column 23,
Line 4, insert the following paragraph before "(ag) indicates"
-- Colloidal silica is Nalco 1130™, 30% in water
(Nalco Chemical Co., Naperville, IL). --
Line 29, "Bu ether))}$^{+}$" should read -- Bu ether)}$^{+}$ --
Line 44, "(dimension maximum length)" should read -- (dimension = maximum length) --

Column 24,
Line 14, "ether))}" should read -- ether)} --

Signed and Sealed this

Twenty-ninth Day of June, 2004

JON W. DUDAS
*Acting Director of the United States Patent and Trademark Office*